United States Patent [19]

Wilk

[11] Patent Number: 5,016,772
[45] Date of Patent: May 21, 1991

[54] COLLAPSIBLE RECEPTACLE ASSEMBLY AND RELATED METHOD

[76] Inventor: Peter J. Wilk, 185 West End Ave., New York, N.Y. 10023

[21] Appl. No.: 488,296

[22] Filed: Mar. 2, 1990

[51] Int. Cl.⁵ .............................................. B65D 6/16
[52] U.S. Cl. ........................................ 220/8; 220/403
[58] Field of Search ................... 220/7, 8, 4 R, 4 A, 220/4 C, 403

[56] References Cited

U.S. PATENT DOCUMENTS

| | | | |
|---|---|---|---|
| 958,857 | 5/1910 | Dennis | 220/8 |
| 1,961,061 | 5/1934 | McCulloch . | |
| 2,323,467 | 7/1943 | Guyer | 220/403 X |
| 2,907,487 | 10/1959 | Harrington | 220/8 |
| 2,912,137 | 11/1959 | Taylor | 220/403 |
| 2,948,624 | 8/1960 | Watson et al. | 220/8 X |
| 3,003,840 | 10/1961 | Katzin | 220/8 X |
| 3,691,671 | 9/1972 | Kroll | 220/8 X |
| 3,839,751 | 10/1990 | Bressler . | |
| 3,869,736 | 3/1975 | Valois et al. . | |
| 3,959,830 | 6/1976 | van den Broek . | |
| 4,216,927 | 8/1980 | Byrd | 220/8 X |
| 4,771,906 | 9/1988 | Hennig et al. | 220/8 |
| 4,818,142 | 4/1989 | Cochran . | |

Primary Examiner—Steven M. Pollard
Attorney, Agent, or Firm—R. Neil Sudol; Henry D. Coleman

[57] ABSTRACT

A collapsible receptacle assembly comprises a first box member having one open face and one open side and a second box member having one open face and one open side, the second box member being larger in at least one dimension than the first box member so that the first box member is nestable within the second box member. The assembly further comprises connectors for slidably connecting the first box member and the second box member to one another so that the first box member is slidably insertable into the second box member.

8 Claims, 4 Drawing Sheets

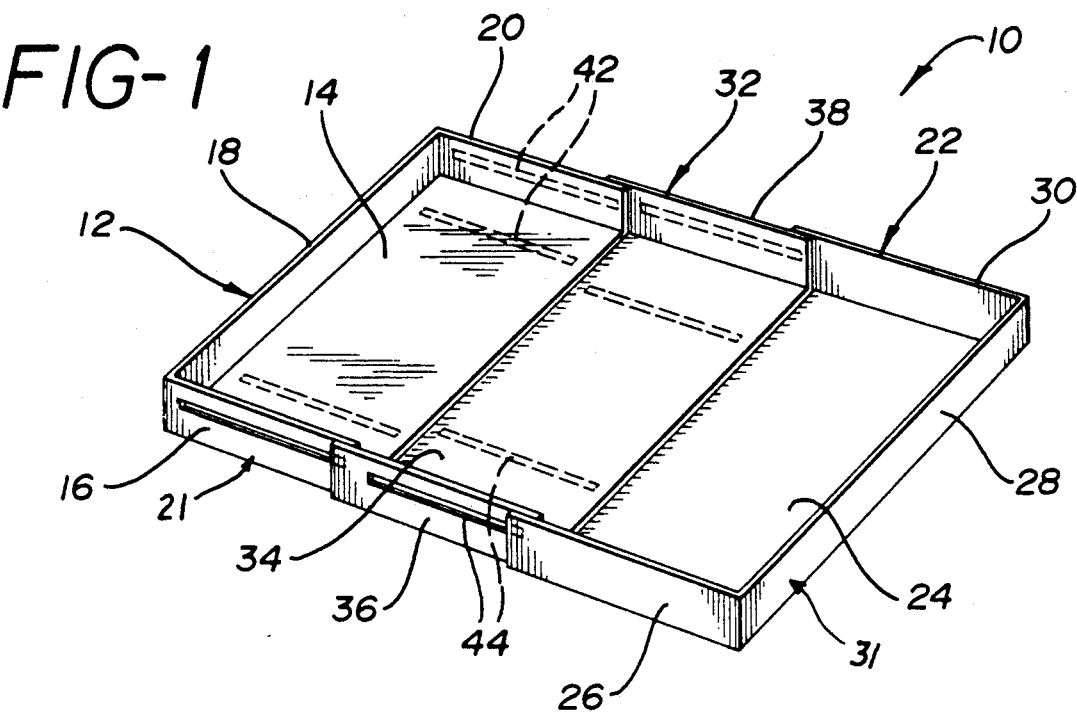
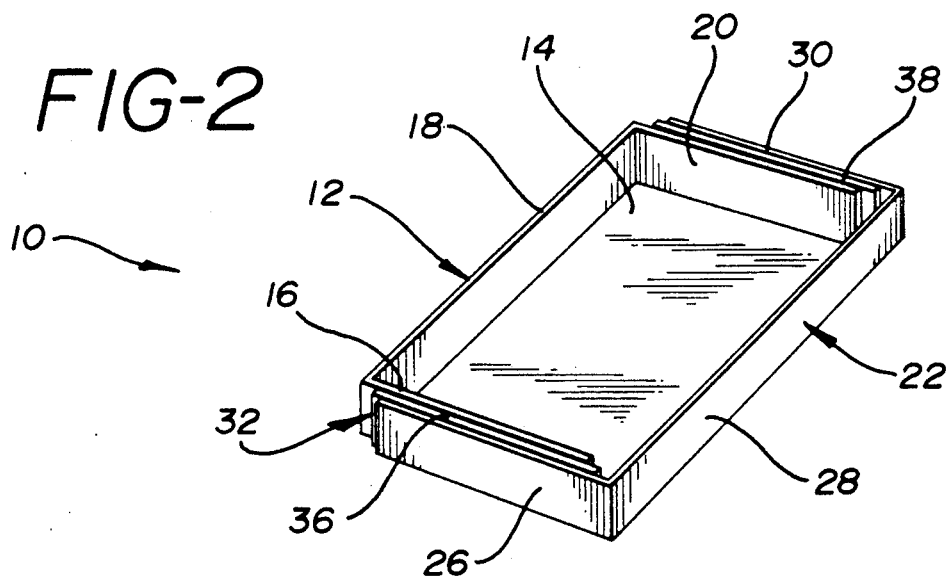
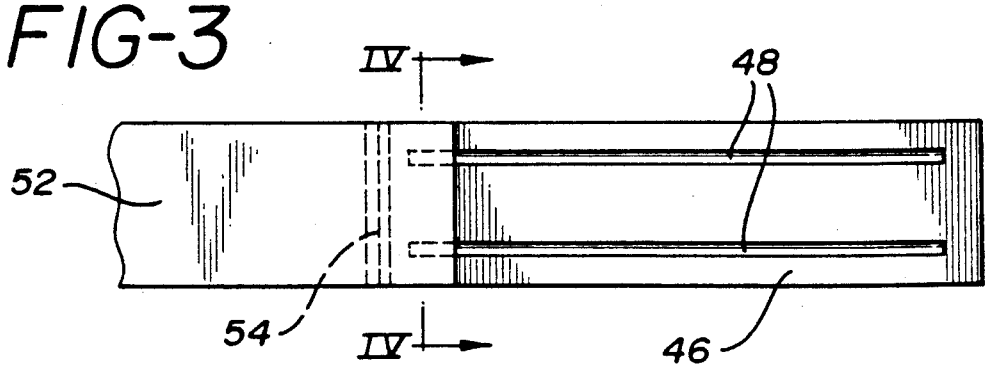

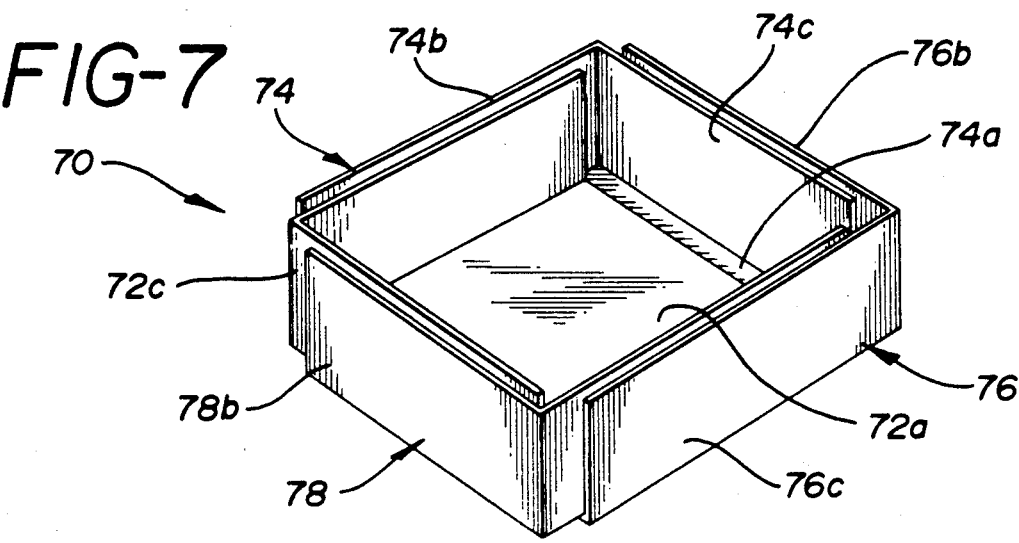
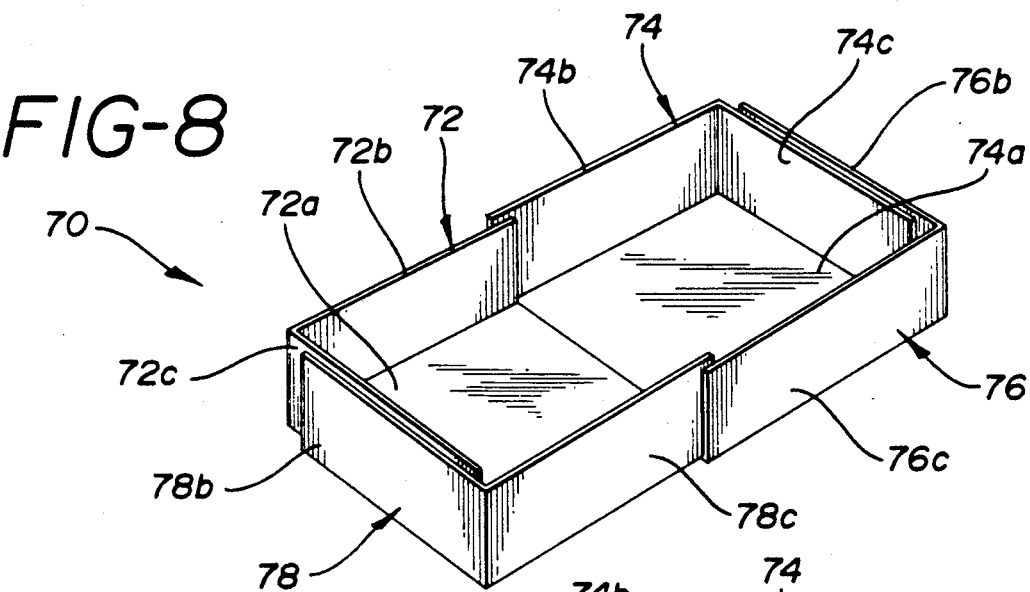
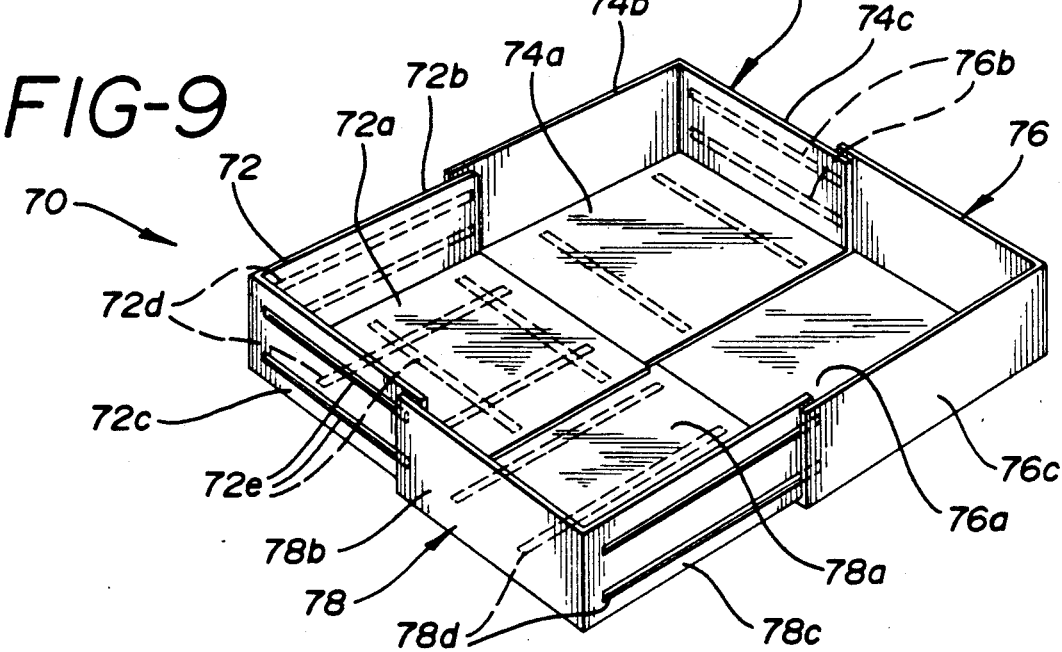

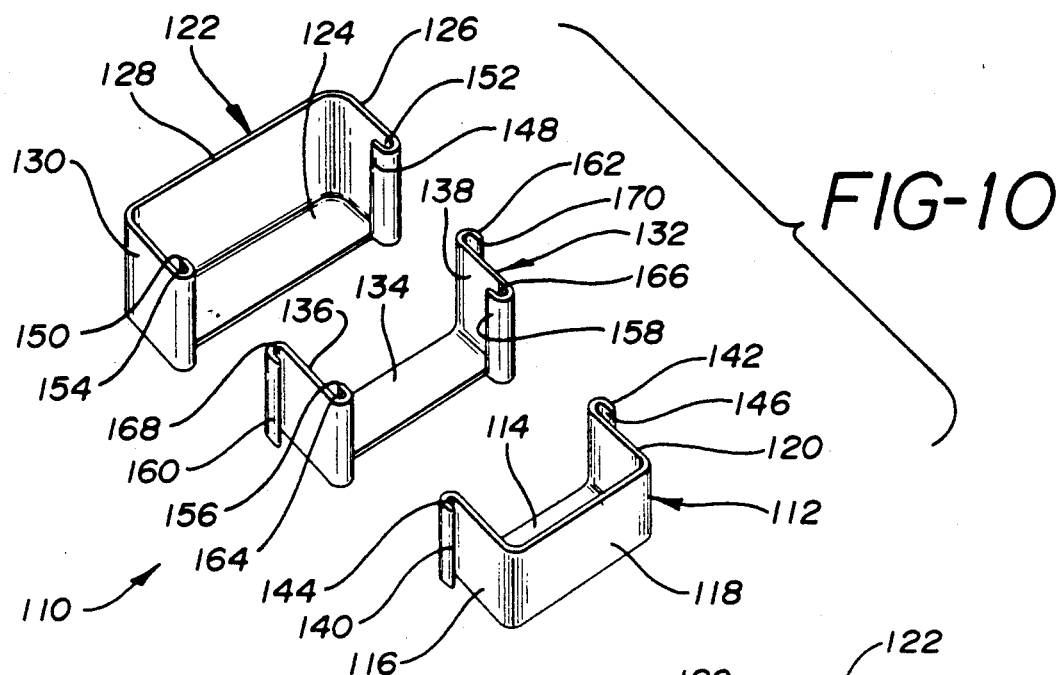

COLLAPSIBLE RECEPTACLE ASSEMBLY AND RELATED METHOD

BACKGROUND OF THE INVENTION

This invention relates to a collapsible receptacle assembly. More particularly, this invention relates to an open face container for holding particulate or fluid material. The invention may be used to provide temporary ice skating rinks and temporary swimming pools, as well as in other applications.

Above-ground swimming pools which are more than mere wading pools are usually disassembled only with the expenditure of considerable effort and time. Consequently, the pools usually remain outdoors throughout the winter months, drained but nevertheless occupying space that might otherwise be used for other purposes.

Similarly, it would be of great benefit to have an ice skating rink assembly which could be easily installed at the onset of cold weather and easily removed after the winter months have passed.

OBJECTS OF THE INVENTION

An object of the present invention is to provide a receptacle assembly for a swimming pool or ice skating rink which can be easily installed and easily removed for storage.

Another object of the present invention is to provide such a receptacle assembly which occupies a reduced space in a storage configuration.

Another, more particular, object of the present invention is to provide such an assembly which is easy and inexpensive to manufacture.

Yet another particular object of the present invention is to provide such an assembly which is easy and inexpensive to manufacture in a variety of sizes and shapes.

Another object of the present invention is to provide a collapsible receptacle assembly.

SUMMARY OF THE INVENTION

A collapsible receptacle assembly in accordance with the present invention comprises a first box member having one open face and one open side and a second box member having one open face and one open side, the second box member being larger in at least one dimension than the first box member so that the first box member is nestable within the second box member. The first box member is slidably inserted in the second box member, and the assembly further comprises locking elements for preventing the first box member from being disconnected from the second box member upon a pulling of the first box member from the second box member through the one open side of the second box member.

In accordance with another feature of the present inventions, the receptacle assembly further comprises connectors for slidably connecting the first box member and the second box member to one another so that the first box member is slidably insertable into the second box member.

Pursuant to another feature of the present invention, the connectors include grooves in at least one of the first box member and the second box member. The grooves are preferably disposed on outer surfaces of sidewalls of either the first box member or the second box member or both. However, the grooves may also be disposed on an outer surface of a base wall of at least one of the box members.

In accordance with a particular embodiment of the present invention, the receptacle assembly further comprises a U-shaped member larger in the one dimension than the first box member and smaller in the one dimension than the second box member so that the first box member is nestable within the U-shaped member which in turn is nestable within the second box member. In this embodiment, the connectors include components for slidably connecting the U-shaped member to the first box member and the second box member so that the first box member is slidably insertable into the U-shaped member which in turn is slidably insertable into the second box member.

Pursuant to yet another feature of the present invention, the receptacle assembly further comprises elements which form a substantially liquid tight seal between the first box member, the U-shaped member and the second box member.

In accordance with another embodiment of the present invention, the first box member and the second box member each incorporate respective pairs of box members slidably connected to one another. More specifically, the first box member comprises a first additional box member having one open face and two open contiguous sides and a second additional box member having one open face and two open contiguous sides, while the second box member comprises a third additional box member having one open face and two open contiguous sides and a fourth additional box member having one open face and two open contiguous sides. The second additional box member is larger in at least one selected dimension than the first additional box member so that the first additional box member is nestable within the second additional box member. In addition, the fourth additional box member is larger in at least one selected dimension than the third additional box member so that the third additional box member is nestable within the fourth additional box member. Moreover, the connectors include components for slidably connecting the first additional box member and the second additional box member to one another so that the first additional box member is slidably insertable into the second additional box member and components for slidably connecting the third additional box member and the fourth additional box member to one another so that the third additional box member is slidably insertable into the fourth additional box member.

Pursuant to yet another feature of the present invention, the receptacle assembly further includes a water impermeable flexible sheet disposed in the first box member and the second box member in a pulled-apart configuration thereof.

In accordance with a more specific description of the invention, a collapsible receptacle assembly comprises a first member including (a) a rectangular planar first base component having four first edges and (b) three rectangular planar first sidewall components each connected along one edge to a respective one of the four first edges, the first sidewall components being connected along transversely extending side edges to one another to form a first substantially C-shaped sidewall having a pair of first legs. The assembly also comprises a second member including (a) a rectangular planar second base component having four second edges and (b) three rectangular planar second sidewall components each connected along one edge to a respective one of the four second edges, the second sidewall components being connected along transversely extending side edges to one another to form a second substantially C-shaped sidewall having a pair of second legs. The first base has a first dimension measured between the legs of the first C-shaped sidewall and the second base has a second dimension measured between the legs of the second C-shaped sidewall, the second dimension being larger than the first dimension so that the first member is nestable and slidably insertable within the second member. In addition, the receptacle assembly comprises locking elements for preventing the disconnection of the members upon a pulling of the first member out from the second member. Connectors may be provided for slidably connecting the first member and the second member to one another.

A method for preparing a children' play station, comprises the initial step of providing a collapsible receptacle assembly comprising:

a first box member having one open face and one open side;

a second box member having one open face and one open side, the second box member being larger in at least dimension than the first box member so that the first box member is nestable within the second box member, the first box member being slidably disposed in the second box member; and locking elements for preventing the first box member from being disconnected from the second box member upon a pulling of the first box member from the second box member through the one open side of the second box member.

In another step, the first box member and the second box member are moved or slid with respect to one another to remove the first box member from the second box member. Upon an opening of the receptacle assembly, it is at least partially filled with a fluid such as water (to provide a swimming pool or ice skating rink) or granular substance such as sand (to provide a sandbox).

In yet another step in accordance with the present invention, a liner of sheet material is placed into the opened receptacle assembly prior to filling with a fluid or granular substance.

A receptacle assembly in accordance with the present invention can be easily assembled and easily taken down for providing a temporary swimming pool or ice skating rink. Upon disassembly or removal for storage, the receptacle assembly occupies a reduced space. Moreover, the assembly is easy and inexpensive to manufacture in a variety of sizes and shapes.

BRIEF DESCRIPTION OF THE DRAWING

FIG. 1 is a schematic isometric view of a collapsible receptacle assembly in accordance with the present invention, in an opened or pulled-apart configuration.

FIG. 2 is a schematic isometric view of the collapsible receptacle assembly of FIG. 1, in a collapsed or pushed-together configuration.

FIG. 3 is a partial side elevational view of another collapsible receptacle assembly in accordance with the present invention.

FIG. 7 is a schematic perspective view of another receptacle assembly in accordance with the present invention, showing the assembly in a completely collapsed configuration.

FIG. 8 is a schematic perspective view of the receptacle assembly of FIG. 7, showing the assembly in a partially opened configuration.

FIG. 9 is a schematic perspective view of the receptacle assembly of FIGS. 7 and 8, showing the assembly in a completely opened configuration.

FIG. 10 is a schematic perspective exploded view of another collapsible receptacle assembly in accordance with the present invention.

FIG. 11 is a schematic perspective view of the receptacle assembly of FIG. 10, in a collapsed storage configuration.

FIG. 12 is a schematic perspective view of the receptacle assembly of FIGS. 10 and 11, in a pulled-apart or opened configuration.

DETAILED DESCRIPTION

Figure 4:
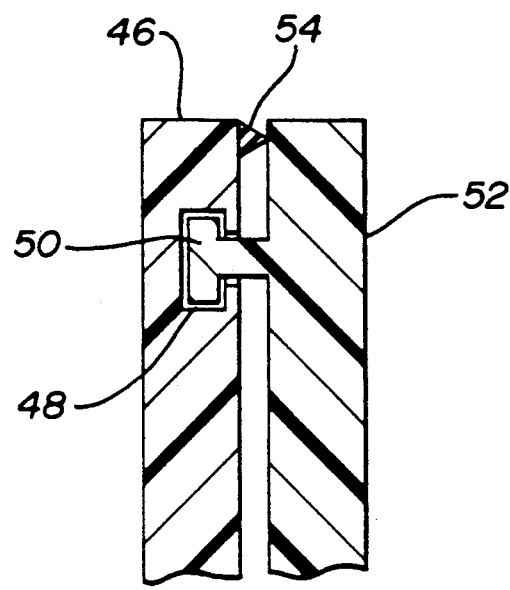
FIG. 4 is a partial cross-sectional view taken along line IV—IV in FIG. 3.

As illustrated in FIGS. 1 and 2, a collapsible receptacle assembly 10 for providing a children's ice skating rink comprises a first box member 12 having a major wall or base component 14 and three sidewall components 16, 18 and 20. Base 14 and sidewalls 16, 18 and 20 are all rectangular, the sidewalls being only several inches high. Sidewalls 16, 18 and 20 are joined to one another along their vertically extending, lateral edges to form a substantially C-shaped composite sidewall 21.

A second box member 22 has a major wall or base component 24 and three sidewall components 26, 28 and 30. Base 24 and sidewalls 26, 28 and 30 are all rectangular and the sidewalls are approximately the same height as sidewalls 16, 18 and 20. Sidewalls 26, 28 and 30 are joined to one another along their vertically extending, lateral edges to form a substantially C-shaped composite sidewall 31.

Box members 12 and 24 are characterizable as having open faces opposite major walls 14 and 24, respectively, and as having open sides opposite sidewall components 18 and 28, respectively.

Receptacle assembly 10 also comprises an additional, U-shaped member 32 having a major wall or base plate 34 and a pair of upstanding sidewall components 36 and 38 attached to opposite edges of base plate 34.

U-shaped member 32 is slightly larger than box member 12 and slightly smaller than box member 22. More specifically, the lengths of base components or plates 14, 34 and 24, i.e., the distances between sidewalls 16 and 20, sidewalls 26 and 30 and sidewalls 36 and 38, increase from one to the other, so that box member 12 is nestable within member 32 which in turn is nestable in box member 22, as shown in FIG. 2.

As shown in FIG. 1, base 14 and sidewalls 16 and 20 are provided along their outer surfaces with cross-sectionally T-shaped elongate grooves 42 for receiving cross-sectionally T-shaped lugs (not shown in FIG. 1) on the inner surfaces of base plate 34 and sidewalls 36 and 38, whereby box member 12 is slidably connectable to and insertable into U-shaped member 32. Similarly, U-shaped member 32 is provided on the outer surfaces of base 34 and sidewalls 36 and 38 with cross-sectionally T-shaped grooves 44 mating with T-shaped projections (see FIG. 4) on the inner surfaces of base 24 and sidewalls 26 and 30, whereby U-shaped member 32 is slidably connected to box member 22.

As illustrated in FIGS. 3 and 4, a lateral sidewall 46 of one receptacle assembly member may be provided on an outer surface with a multiplicity of T-shaped grooves 48 each receiving a respective T-shaped lug 50 which projects inwardly from a sidewall 52 of another receptacle assembly member. In addition, where receptacle assembly 10 is used as a children's ice skating rink or as an above-ground swimming pool (the sidewalls are of course higher in that application), either the outer surface of sidewall 46 or the inner surface of sidewall 52 is provided with an elongate sealing rib 54 preferably made of a resilient material different from the essentially rigid material of box members 12 and 22 and U-shaped member 32. However, rib 54 may be of the same material as the box member or U-shaped member of which it forms a component part.

Figure 5:
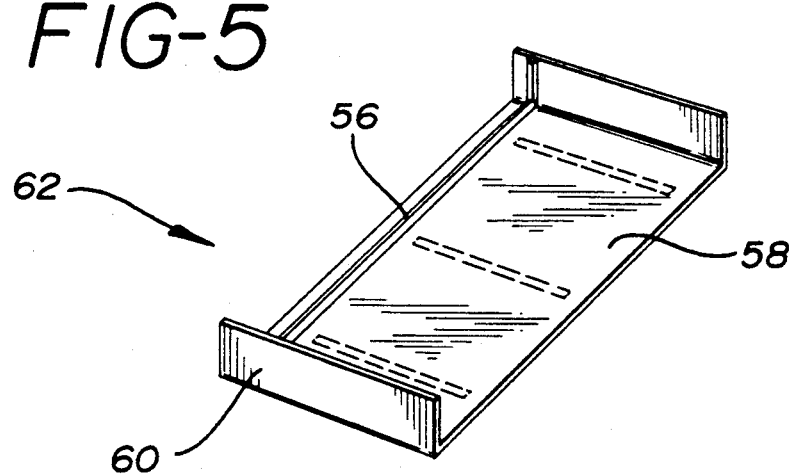
FIG. 5 is a schematic perspective view of a U-shaped member of a collapsible receptacle assembly similar to that of FIGS. 1 and 2.

As shown in FIG. 5, a resilient sealing rib 56 extends along both the base 58 and the two opposing sidewalls 60 of the respective receptacle assembly member 62.

Figure 6:
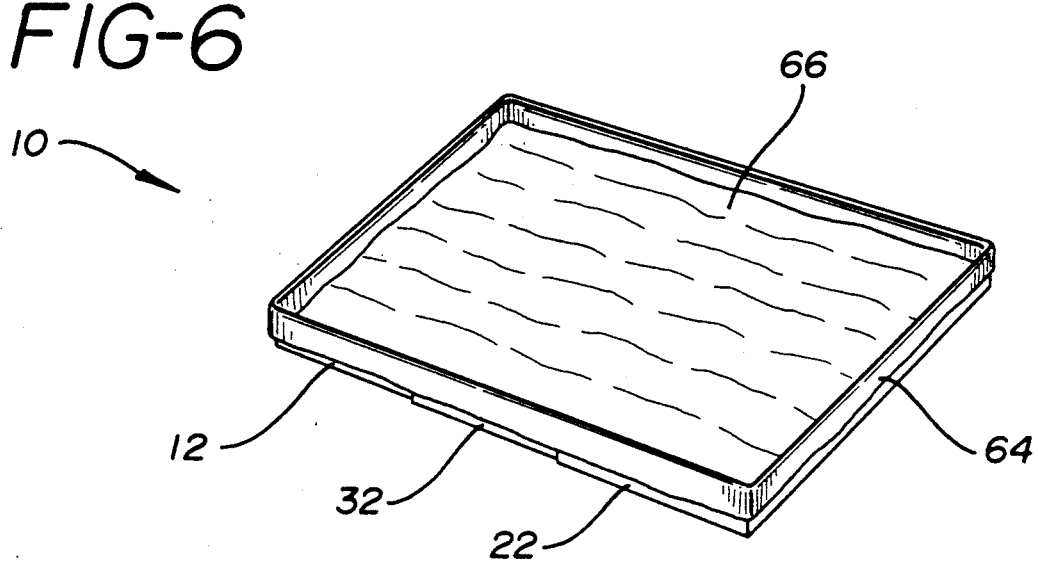
FIG. 6 is a schematic perspective view of a collapsible receptacle assembly similar to that of FIGS. 1 and 2, showing a liner member and a substance filling the opened receptacle assembly.

As depicted in FIG. 6, a substantially impermeable sheet or web 64 of flexible synthetic resin material may be disposed in receptacle assembly 10 upon the sliding of members 12, 22 and 32 into an opened configuration. The sheet serves as a liner performing an added sealing function.

In the case that the receptacle assembly is being used as a swimming pool or ice skating installation, the opened receptacle assembly is filled with water 66. In the case of the skating rink, the water is further permitted to freeze.

As shown in FIGS. 7-9, another receptacle assembly 70 comprises four box-like members 72, 74, 78 and 80 each including a major wall or base portion 72a, 74a, 76a and 78a, as well as two contiguous sidewalls 72b and 72c, 74b and 74c, 76b and 76c, 78b and 78c. Member 72 is provided in an outer surface of base 72a and an outer surface of sidewall 72b with a plurality of elongate, cross-sectionally T-shaped grooves 72d slidably receiving respective cross-sectionally T-shaped projections (not shown) on the inner surfaces of base 74a and sidewall 74b, whereby member 74 slidably receives member 72 in a nesting configuration. Member 74 in turn is provided on the outer surfaces of base 74a and sidewall 74c with a plurality of elongate, cross-sectionally T-shaped grooves 74d slidably receiving respective cross-sectionally T-shaped projections (not shown) on the inner surfaces of base 76a and sidewall 76b, whereby member 76 slidably receives member 74 in a nesting configuration.

Member 72 is also provided in an outer surface of base 72a and an outer surface of sidewall 72c with a plurality of elongate, cross-sectionally T-shaped grooves 72e slidably receiving respective cross-sectionally T-shaped projections (not shown) on the inner surfaces of base 78a and sidewall 78b, whereby member 78 slidably receives member 72 in a nesting configuration. Member 78 in turn is provided on the outer surfaces of base 78a and sidewall 78c with a plurality of elongate, cross-sectionally T-shaped grooves 78d slidably receiving respective cross-sectionally T-shaped projections (not shown) on the inner surfaces of base 76a and sidewall 76b, whereby member 76 slidably receives member 78 in a nesting configuration.

In the completely closed or collapsed configuration of receptacle assembly 70, member 72 is nested within member 74 which in turn is nested within member 78 in turn nested within member 76.

Another collapsible container or receptacle assembly 110 is shown in an exploded, a collapsed and an opened configuration in FIGS. 10, 11 and 12, respectively. Various details of FIGS. 10-12 have been enlarged for purposes of illustration.

As illustrated in those drawing figures, receptacle assembly 110 comprises a first box member 112 having a major Wall or base component 114 and three sidewall components 116, 118 and 120. Base 114 and sidewalls 116, 118 and 120 are all substantially rectangular, sidewalls 116, 118 and 120 being joined together along their vertically extending, lateral edges to form a substantially C-shaped composite sidewall 121.

A second box member 122 has a major wall or base component 124 and three sidewall components 126, 128 and 130. Base 124 and sidewalls 126, 128 and 130 are all essentially rectangular and the sidewalls are approximately the same height as sidewalls 116, 118 and 120. Sidewalls 126, 128 and 130 are joined to one another along their vertically extending, lateral edges to form a substantially C-shaped composite sidewall 131.

Box members 112 and 124 are characterizable as having open faces opposite major walls 114 and 124, respectively, and as having open sides opposite sidewall components 118 and 128, respectively.

Receptacle assembly 110 also comprises an additional, U-shaped member 132 having a major wall or base plate 134 and a pair of upstanding sidewall components 136 and 138 attached to opposite edges of base plate 134.

U-shaped member 132 is slightly larger than box member 112 and slightly smaller than box member 122. More specifically, the lengths of base components or plates 114, 134 and 124, i.e., the distances between sidewalls 116 and 120, sidewalls 126 and 130 and sidewalls 136 and 138, increase from one to the other, so that box member 112 is nestable within member 132 which in turn is nestable in box member 122, as shown in FIG. 2.

Sidewalls 116 and 120 are provided along their free vertical edges with outwardly turned lips 140 and 142 forming respective vertically extending grooves 144 and 146. Similarly, sidewalls 126 and 130 are provided along their free lateral edges with inwardly turned lips 148 and 150 defining a pair of vertical grooves 152 and 154. Sidewalls or plates 136 and 138 have inwardly turned lips 156 and 158 along one set of lateral edges and outwardly turned lips 160 and 162 along an opposite set of vertical or lateral edges. Lips 156 and 158 define grooves 164 and 166, while lips 160 and 162 form another pair of grooves 168 and 170.

As illustrated in FIG. 12, the lips and grooves along the free edges of sidewalls 116, 120, 126, 130, 136 and 138 cooperate to arrest the motion of members 112, 122 and 132 with respect to one another during an opening or pulling apart of receptacle assembly 110 from the collapsed configuration of FIG. 11 to the opened configuration of FIG. 12. In the completely opened configuration of receptacle assembly 110, lips 140 and 142 are seated within grooves 164 and 166, lips 156 and 158 within grooves 144 and 146, lips 148 and 150 within grooves 170 and 168, and lips 160 and 162 within grooves 154 and 152. The interlocking of the lips thus prevents receptacle assembly 110 from being opened beyond a pre-established limit and a concomitant disassembly of the receptacle assembly during a pulling apart operation.

Receptacle assembly 110 may be provided with sealing ribs such as described hereinabove with reference to FIGS. 3 and 5.

A collapsible receptacle assembly in accordance with the present invention may be made of essentially any durable and substantially rigid material, such as metal and certain hardened resins.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are preferred by way of example to facilitate comprehension of the invention and should not be construed to limit the scope thereof.

What is claimed is:

1. A collapsible receptacle assembly comprising:
    a first box member having one open face and one open side;
    a second box member having one open face and one open side, said second box member being larger in at least one dimension than said first box member so that said first box member is nestable within said second box member, said first box member being slidably inserted in said second box member;
    locking means for preventing said first box member from being disconnected from said second box member upon a pulling of said first box member from said second box member through the one open side of said second box member;
    sealing means permanently attached in part to at least one of said first box member and said second box member for forming a substantially liquid tight seal between said first box member and said second box member.

2. The receptacle assembly defined in claim 1, further comprising connector means for slidably connecting said first box member and said second box member to one another.

3. The receptacle assembly defined in claim 2 wherein said connector means includes grooves in at least one of said first box member and said second box member.

4. The receptacle assembly defined in claim 2 wherein said connector means includes a U-shaped member larger in said one dimension than said first box member and smaller in said one dimension than said second box member so that said first box member is nestable within said U-shaped member in turn nestable within said second box member.

5. The receptacle assembly defined in claim 4 wherein said sealing means includes means for forming a substantially liquid tight seal between said first box member and said U-shaped member and between said U-shaped member and said second box member.

6. A method for preparing a children' play station, comprising the steps of:
    providing a collapsible receptacle assembly comprising:
        a first box member having one open face and one open side;
        a second box member having one open face and one open side, said second box member being larger in at least dimension than said first box member so that said first box member is nestable within said second box member, said first box member being slidably inserted in said second box member; and
        locking means for preventing said first box member from being disconnected from said second box member upon a pulling of said first box member from said second box member through the one open side of said second box member;
    providing a liner of sheet material;
    positioning said first box member and said second box member in a relatively collapsed configuration on a surface accessible to children;
    sliding said first box member and said second box member with respect to one another to remove at least a major portion of said first box member from said second box member;
    placing said liner into the opened receptacle assembly; and
    at least partially filling the liner in the opened receptacle assembly with a fluid or granular substance.

7. The method defined in claim 6 wherein said fluid or granular substance is water.

8. The method defined in claim 6, further comprising the step of freezing said water to form an ice skating surface.

* * * * *